Figure 1:
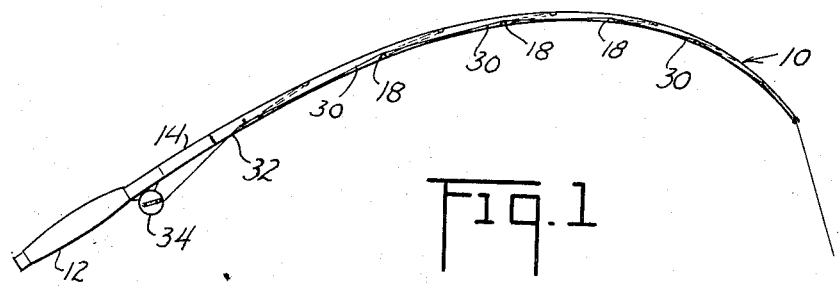

Jan. 15, 1957     M. E. CUSHMAN     2,777,239
FISHING RODS
Filed July 1, 1954

INVENTOR
MAURICE E. CUSHMAN
BY
ATTORNEY

United States Patent Office 2,777,239
Patented Jan. 15, 1957

2,777,239
FISHING RODS
Maurice E. Cushman, Verona, N. J.
Application July 1, 1954, Serial No. 440,829
12 Claims. (Cl. 43—18)

This invention concerns improvements in fishing rods, and relates particularly to improvements in guiding fishing line which passes through a hollow fishing rod.

Conventional fishing rods are equipped with a series of external ring-like line guides secured along the rod, through which line is threaded to follow, approximately, the curve of the rod, when flexed. The guide rings are sometimes lined with agate or other hard material to minimize wear and scoring of the guides, and consequent wear and abrasion of the line.

Conventional guides are a source of annoyance to fishermen, as they are easily bent or broken, and frequently the lashing of the guides loosens or frays through rough handling and through flexing of the rod in use. Also, the local stiffening of the rod at the guides adversely affects the normally uniform flexing or "action" of the rod. A primary disadvantage of conventional external guides and line lies in the frequent snagging of line during rod use, along with the air resistance during casting, which tends to retard the action and whip of the rod.

Some rods have been made hollow, and attempts have been made to run the line through the rod hollow of the rod and out through the tip. The entire inner wall of the rod thus acts as a guide, but unfortunately, the frictional drag on the line becomes excessive and such an arrangement is quite unsatisfactory.

According to my invention, the line is run through a hollow rod, but the rod is provided internally with line guide rings or suitably shaped elements which provide spaced supports, the rings or the like being made of hard, wear resistant material which will minimize friction as the line passes thereover. The rod may be made from tubular steel or other metal, hollow Fiberglas, bamboo or other material. Most hollow rods are made with a tapered bore. Internal guides for such rods may be formed by winding a tapered spring of hard stainless steel and drawing it through the rod bore from root to tip. The coils, during the drawing, will seat progressively along the wall of the tapered rod bore, the successive turns of the spring spacing along the interior of the rod at intervals, as desired, and according to the design of the original spring. The ends of the spring are suitably secured at the ends of the rod or rod section, which holds all coils of the spring firmly in place.

Alternatively, the wire coil may be placed over a helically grooved mandrel, and the rod may be formed over or drawn over the mandrel. When all is secure, the mandrel may be unscrewed from the rod and guide coil, and the rod finished with suitable end ferrules and other needed furniture.

The rod of the invention may readily be adapted to the various forms of fishing rods, such as flying casting, bait casting, spinning, surf casting, trolling etc. One form of my rod, for whatever purpose, may lead the line through the butt of the rod, all the way to the tip, while another may lead the line through a port in the side of the rod near the butt, the line passing thence through the rod and out through a tip ferrule.

Figure 2:
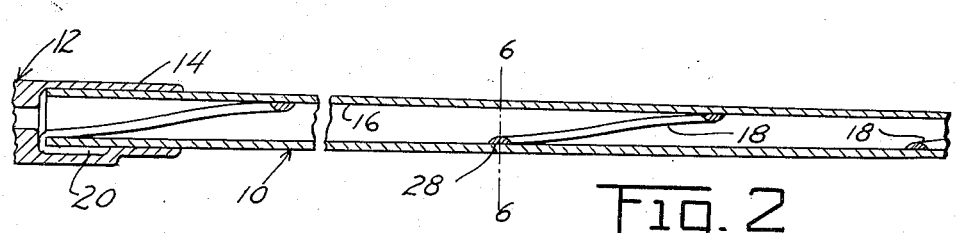
Figure 4:
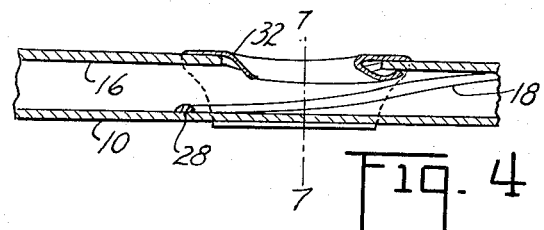
Figure 3:
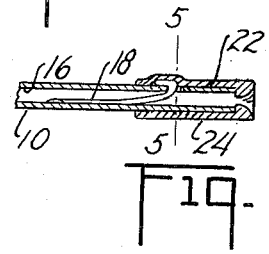
Figure 7:
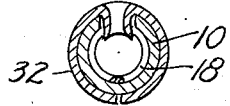
Figure 6:
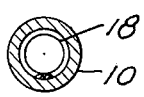
Figure 5:

For an understanding of further details of my invention, reference may be made to the attached drawings, in which:

Fig. 1 is an overall view of a fishing rod according to my invention,

Figs. 2, 3, and 4 are short, enlarged sections of the rod,

Figs. 5, 6, and 7 are respectively sections on the lines 5—5, 6—6, and 7—7 of Figs. 2, 3, and 4.

Figure 8:
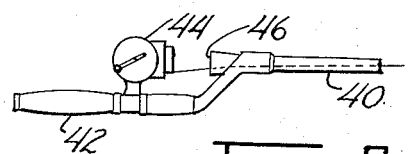
Figure 9:
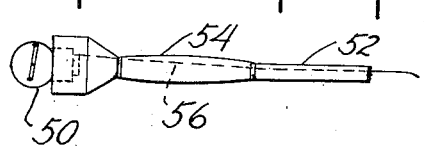

Fig. 8 is a view of the butt end of a rod with offset handle wherein the line passes through the entire length of the hollow rod, and Fig. 9 is a view of a concentric, enclosed reel rod wherein the line is completely housed within the rod.

Figs. 1–7 show a hollow, one-piece tapered rod 10 of any suitable material such as metal, wood or reinforced plastic. To the butt end, a handle 17 is secured by a ferrule 14 embracing the rod. Within the hollow 16 of the rod is disposed a helical line guide 18, the left end (as shown) being bent around the rod end as at 20 to be embraced by the ferrule 14. The guide winds round the rod within its hollow all the way from root to tip. At the tip, the guide end passes to the outside of the rod through a suitable slot or hole 22, where the external end is embraced by a tip ferrule 24 through which the fishing line passes. The ferrule 24 is preferably bell-mounted to let the line pay off or into the rod in any direction with minimum friction. The tip ferrule is firmly secured to the tip of the rod 10.

The helical line guide 18 is preferably formed from hard, corrosion resistant wire, and may be wound as a spaced-turn spring which is drawn through the rod bore from root to tip and secured in place. Alternatively, it may be formed in its final configuration, placed on a grooved mandrel, and the rod formed over the mandrel, as suggested above.

Preferably the line guide wire is of segmental cross-section as shown, the flat portion of the wire engaging the rod inner wall as at 28, and the curved portion protruding into the bore to be engaged by a fishing line. The relatively flat curvature of the line-engaging part of the guide prevents sharp bending of the fishing line where it passes over the guide. Other cross-sections of guide material may be used, although the form shown is preferred at this time.

The pitch of the guide helix, or the spacing of line guide turns within the rod bore, is determined so that the line, in passing through a flexed rod will only engage the line guides and will not engage the bore wall of the rod itself. This is illustrated in Fig. 1, where runs 30 of the line between guide protuberances 18 are free of contact with the rod proper. This arrangement minimizes frictional drag of the line as it passes through the rod, enabling free casting and winding-in. With the rod flexed and the line loaded in tension, considerable drag would occur if the line were permitted to rub along the inner surface of the rod. The line guides also serve to distribute rod-flexing loads along the rod.

Fig. 1 in connection with Fig. 4 shows entry of the fishing line into the rod hollow through a guide 32 passing through the wall of the rod 10 at a distance from the rod butt. The guide 32 may be formed or molded into the rod, or may comprise a clip arrangement as shown, embracing a portion of the rod. Where the guide 32 passes through the rod wall, it is smoothly faired to enable the line to pass without snagging or binding.

In Fig. 1, the rod is shown as equipped with a conventional spool-reel 34 located in the position for the usual bait-casting configuration. The rod may also be built for the fly-casting configuration where the reel is near the butt end of the rod.

The invention may also be applied as shown in Figs. 8 and 9. Fig. 8 shows the rod 40 with an offset handle 42 mounting a spinning reel 44. Line from the reel may pass directly into the rod hollow through the rod butt as at 46. A spool reel may be used in lieu of a spinning reel. Fig. 9 shows an enclosed reel 50 at the butt of the hollow rod 52, the handle 54 being disposed toward the tip from the reel. Herein, line 56 may pass directly from the reel through the hollow handle and rod, and either spinning or spool reels may be adapted.

The terms "helix" and "helical" as used herein are intended to include generally spirally or helically shaped elements, where the spacing between turns is either uniform or non-uniform, and where the diameter of the turns may be uniform or may diminish in accordance with the taper of the bore of the fishing rod.

The invention has been described predominantly in association with a rod which is in one piece from butt to tip. However, the invention can readily be applied to jointed or multisection rods comprising pieces which are fitted together in end to end relation. When used in jointed rod sections, the invention consists in having a helical line guide element within each rod section, the helix ends being secured to the end ferrules of each section. Toward the butt end of the rod it is only necessary for the line guide to extend to the point where the fishing line enters the rod hollow. If the line passes through the rod wall at a point remote from the butt end, the line guide may terminate adjacent the line entry opening, and need not extend therebeyond toward the butt.

Several alternative embodiments of the invention have been illustrated and described, but it is to be understood that changes may be made without departing from the spirit or scope of the invention. Reference should be made to the appended claims for definitions of the limits of the invention.

What I claim is:

1. A fishing rod comprising a hollow member of flexible material having a root and a tip, and a line guide within the hollow of said member comprising a continuous spaced-turn helix of flexible hard wear resistant material, the outer run of said helix contacting the inner surface of said member substantially from at or near the root to the tip thereof.

2. A fishing rod comprising a hollow member of flexible material having a root and a tip, and a line guide within the hollow of said member comprising a continuous spaced-turn helix of flexible hard wear resistant material, the outer run of said helix contacting the inner surface of said member substantially from at or near the root to the tip thereof, the successive convolutions of said helix having their respective corresponding portions spaced apart a distance of the order of four helix diameters of respective convolutions.

3. A fishing rod comprising a hollow member of flexible material having a root and a tip, and a line guide within the hollow of said member comprising a continuous spaced-turn helix of flexible hard wear resistant material, the outer run of said helix contacting the inner surface of said member substantially from at or near the root to the tip thereof, said helix comprising wire having a cross-section including a flat outer run and a convex inner run.

4. A fishing rod comprising a hollow member of flexible material having a root and a tip, and a line guide within the hollow of said member comprising a continuous spaced-turn helix of flexible hard wear resistant material, the outer run of said helix contacting the inner surface of said member substantially from the root to the tip thereof and the inner run projecting inwardly of said hollow from the inner wall of said member.

5. A fishing rod comprising a hollow member of flexible material having a root and a tip, and a line guide within the hollow of said member comprising a continuous spaced-turn helix of flexible hard wear resistant material, the outer run of said helix contacting the inner surface of said member substantially from the root to the tip thereof, the pitch of said helix being such that, when said rod is flexed from linearity, the inner crests of successive helix turns are of such height that a straight line running from one to the next is free of contact with the inner wall of said member.

6. A fishing rod comprising a hollow member of flexible material, the hollow through said member having a spaced-turn helical projection therein which acts as a line guide for a line threaded through the hollow of said member.

7. A fishing rod comprising a hollow member of flexible material, the hollow through said member having a helical projection therein which acts as a line guide for a line threaded through the hollow of said member, the successive convolutions of said helical projection being relatively widely spaced.

8. A fishing rod comprising a hollow flexible rod through at least part of which a fishing line is adapted to pass, the hollow through said rod having a succession of line guides therealong to support the fishing line and to hold the line from engagement with the inner wall of said rod even when said rod is curvedly flexed, said line guides comprising a spaced-turn helical land within the rod hollow.

9. A fishing rod comprising a hollow flexible rod through at least part of which a fishing line is adapted to be passed, the hollow through said rod having a succession of line guides therealong to support the fishing line and to hold the line from engagement with the inner wall of said rod even when said rod is curvedly flexed, said line guides comprising a spaced-turn helix of wire stretched within the rod hollow, and means to secure the wire ends toward the butt and adjacent the tip of the rod.

10. A fishing rod comprising a hollow flexible rod through at least part of which a fishing line is adapted to be passed, the hollow through said rod having a succession of line guides therealong to support the fishing line and to hold the line from engagement with the inner wall of said rod even when said rod is curvedly flexed, said line guides comprising a helix of wire stretched within the rod hollow, and means to secure the wire ends toward the butt and adjacent the tip of the rod, said wire having a substantially circular segmental cross-section with the flat part lying adjacent the rod hollow wall and the arcuate part protruding into the rod hollow.

11. A fishing rod comprising a hollow flexible tube adapted for passage of a fishing line therethrough, a spaced-turn helical wire line guide extending through the hollow thereof, the ends of said helical wire extending close to the tube ends, and ferrules embracing the wire ends and tube ends and securing them from relative movement.

12. A fishing rod comprising a hollow flexible tube adapted for passage of a fishing line therethrough, a spaced-turn helical wire line guide extending through the hollow thereof, the ends of said helical wire extending close to the tube ends, and ferrules embracing the wire ends and tube ends and securing them from relative movement, said wire ends being bent back upon themselves on the outside of the tube and underlying said ferrules.

References Cited in the file of this patent

UNITED STATES PATENTS

| | | |
|---|---|---|
| 1,472,518 | Gillette et al. | Oct. 30, 1923 |
| 1,595,275 | White | Aug. 10, 1926 |
| 2,306,638 | Meisler | Dec. 29, 1942 |
| 2,324,429 | Rondelli | July 13, 1943 |
| 2,334,646 | Price | Nov. 16, 1943 |
| 2,442,817 | Lyle | June 8, 1948 |
| 2,484,727 | Patterson | Oct. 11, 1949 |
| 2,578,663 | Beaupre | Dec. 18, 1951 |
| 2,697,894 | Graham et al. | Dec. 28, 1954 |